United States Patent
Suk et al.

(10) Patent No.: US 6,686,678 B2
(45) Date of Patent: Feb. 3, 2004

(54) FLAT PANEL DISPLAY HAVING MESH GRID

(75) Inventors: Bong-Kyung Suk, Busan (KR); Cheol-Hyeon Chang, Yangsan (KR); Dong-Su Chang, Yangsan (KR)

(73) Assignee: Samsung SDI Co., Ltd., Suwon (KR)

( * ) Notice: Subject to any disclaimer, the term of this patent is extended or adjusted under 35 U.S.C. 154(b) by 0 days.

(21) Appl. No.: 10/370,943

(22) Filed: Feb. 21, 2003

(65) Prior Publication Data

US 2003/0230960 A1 Dec. 18, 2003

(30) Foreign Application Priority Data

Jun. 12, 2002 (KR) ........................... 2002-32913

(51) Int. Cl.⁷ ............................... H01J 19/42
(52) U.S. Cl. ................. 313/292; 313/495; 313/497; 313/422; 313/308
(58) Field of Search ................. 313/292, 495, 313/496, 497, 422, 308, 252

(56) References Cited

U.S. PATENT DOCUMENTS 6,034,658 A    3/2000  Grand-Clement et al.
6,489,718 B1 * 12/2002 Schmid et al. ............. 313/495
6,541,900 B1 *  4/2003 Ando ......................... 313/292
6,603,254 B1 *  8/2003 Ando ......................... 313/495

* cited by examiner

Primary Examiner—Ashok Patel
(74) Attorney, Agent, or Firm—Christie, Parker & Hale, LLP

(57) ABSTRACT

A flat panel display having a mesh grid assembly which includes upper and lower spacers integral therein. The flat panel display includes a faceplate and a backplate provided opposing one another with a predetermined gap therebetween to define an exterior of the display. An illuminating assembly is provided in the display, the illuminating assembly realizing predetermined images. A mesh grid is provided between the backplate and the faceplate. A lower spacer is connected to a surface of the mesh grid opposing the backplate to be supported by the backplate. Upper spacers are connected to a surface of the mesh grid opposing the faceplate to be supported by the faceplate. The mesh grid, the lower spacer, and the upper spacers thereby integrally forming a single structural assembly.

23 Claims, 7 Drawing Sheets

FLAT PANEL DISPLAY HAVING MESH GRID

CROSS REFERENCE TO RELATED APPLICATIONS

This application claims priority to and the benefit of Korean Application No. 2002-32913 filed Jun. 12, 2002, in the Korean Intellectual Property Office, the disclosure of which is incorporated herein by reference.

BACKGROUND OF THE INVENTION

1. Field of the Invention

The present invention relates to a flat panel display (FPD), and more particularly, to an FPD having a mesh grid between cathode electrodes and an anode electrode.

2. Description of the Related Art

Generally, an FPD is a display device structured such that side walls are provided between a faceplate and a backplate that are provided substantially in parallel with a predetermined gap therebetween, and this assembly is sealed while maintaining a high vacuum state therein. At least one spacer is mounted within the FPD to prevent damage to the display by the difference in pressure inside the display and the atmospheric pressure outside the display, and to maintain a uniform spacing (cell gap) between the faceplate and backplate. The spacer is mounted within the display with opposing surfaces closely contacting the plates such that the two plates are supported by the spacer.

In the case where the FPD is a high voltage type device, the cell gap between the plates increases to 1 mm or greater. This prevents electrons emitted from electron emission sources from landing on their intended phosphors, and instead results in the electrons striking the phosphors of wrong pixels to illuminate the same. To solve this problem in the conventional high voltage FPD, a mesh type grid (or simply mesh grid) is mounted between cathode electrodes and an anode electrode. The mesh grid acts as a focusing electrode that controls the flow of electrons emitted from the electron emission sources. Such a prior art device is disclosed in U.S. Pat. No. 6,034,658.

When a mesh grid is included in the conventional FPD, the interrelation between the mesh grid and spacer is extremely important. This is because the mesh grid must be provided over an entire display region of the FPD, and the spacer must maintain the mesh grid in a good state while continuing to perform its function of maintaining a specific cell gap between the plates as described above. Although it is possible to use instead of this single spacer a plurality of different types of spacers to support the mesh grid, the increase in the number of parts in this case brings about other problems. Therefore, there are efforts in the industry to utilize only one spacer to both maintain the cell gap and support the mesh grid.

In conventional displays, there is no disclosure of a spacer that supports a second grid, which corresponds to the mesh grid. Therefore, if the FPD is made of a large size, sagging of the second grid may occur to thereby result in preventing good operation of the display device. Although it is possible to support the mesh grid with the spacers used in conventional FPDs, in this case, it is necessary to insert a plurality of the spacers one at a time in holes of the mesh grid in a state where the same is aligned with a substrate, then to install the mesh grid onto the substrate. These processes are difficult to perform and may cause deformation of the mesh grid.

SUMMARY OF THE INVENTION

In accordance with the present invention a flat panel display is provided having a mesh grid between cathode electrodes and an anode electrode. In one embodiment, the present invention provides a flat panel display including a faceplate and a backplate provided opposing one another with a predetermined gap therebetween to define an exterior of the display. An illuminating assembly is provided in the display, the illuminating assembly realizing predetermined images. A mesh grid is provided between the backplate and the faceplate. A lower spacer is connected to a surface of the mesh grid opposing the backplate to be supported by the backplate. Upper spacers are connected to a surface of the mesh grid opposing the faceplate to be supported by the faceplate. The mesh grid, the lower spacer, and the upper spacers are integrally formed into a single structural assembly.

Holding extensions are formed on opposing ends of the mesh grid. The holding extensions support the upper spacers, and are formed at predetermined intervals and bent toward the faceplate such that holding grooves are formed between the holding extensions. Ends of the upper spacers are inserted into the holding grooves to be secured therein.

The holding extensions may be bent to be perpendicular to the mesh grid or bent such that a right angle is not made with the mesh grid.

The mesh grid is substantially rectangular having long sides and short sides, and the upper spacers may be provided along a direction of the long sides of the mesh grid for mounting to the mesh grid, or provided along a direction of the short sides of the mesh grid for mounting to the mesh grid. It is preferable that the upper spacers are bar-shaped.

It is also possible for the upper spacers to be provided along directions of the short sides and the long sides of the mesh grid for mounting to the mesh grid, thereby realizing a lattice configuration.

The lower spacer includes a frame having four sides, and a plurality of supports provided at predetermined intervals within the frame and formed integrally to the same, the supports providing support to the mesh grid.

The frame and the supports are made of a metal structure, and an insulating layer is provided to a predetermined thickness on a surface of the metal structure. The frame and the supports of the lower spacer may also be made of glass or ceramic.

The upper spacers may be mounted on the mesh grid in the same direction as the supports of the lower spacer, and either aligned with the supports of the lower spacer or provided at locations corresponding to between the supports of the lower spacer. The upper spacers may also be mounted on the mesh grid in a direction perpendicular to the supports of the lower spacer.

The illuminating assembly includes cathode electrodes formed on a surface of the backplate facing the faceplate, gate electrodes provided over the cathode electrodes in a direction substantially perpendicular to the cathode electrodes, an insulating layer interposed between the cathode electrodes and the gate electrodes, electron emission sources provided within holes formed passing through the insulating layer and the gate electrodes, and contacting the cathode electrodes, an anode electrode formed on a surface of the faceplate opposing the backplate, and phosphor layers formed on the anode electrode.

DETAILED DESCRIPTION

Figure 1:
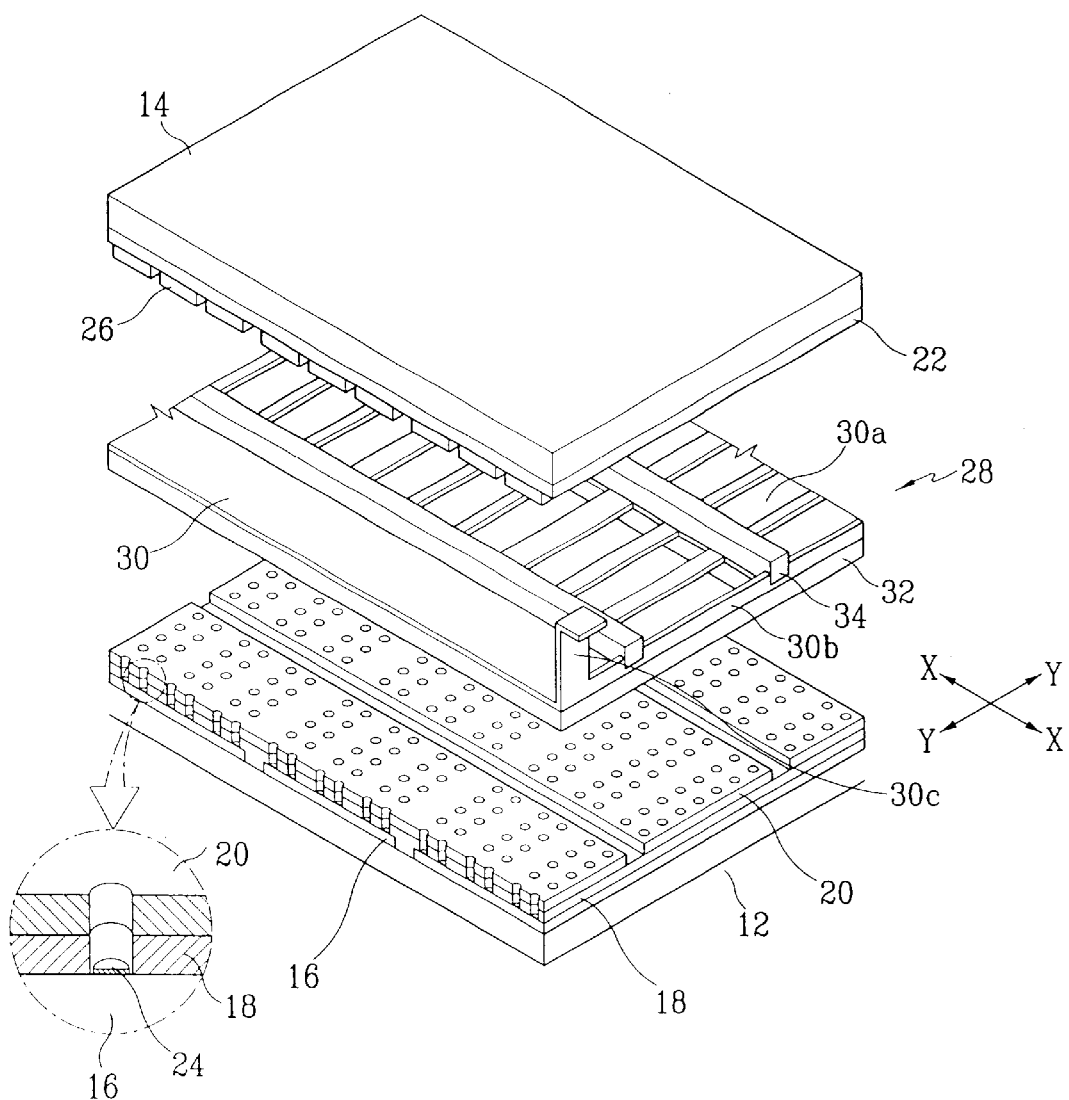
FIG. 1 is a partial exploded perspective view of a flat panel display according to an embodiment of the present invention.

Reference will now be made in detail to the present embodiments of the present invention, examples of which are illustrated in the accompanying drawing, wherein like reference numerals refer to like elements throughout.

FIG. 1 is a partial exploded perspective view of an FPD according to an embodiment of the present invention. The FPD is a field emission display.

The FPD includes backplate 12 and faceplate 14 that are provided substantially in parallel with a predetermined gap therebetween. Backplate 12 and faceplate 14 are fused into a single assembly while maintaining a high vacuum state between these elements. An illuminating assembly for realizing predetermined images is provided in the FPD. The illuminating assembly includes cathode electrodes 16 provided in a line pattern on a surface of backplate 12 facing faceplate 14, gate electrodes 20 provided over cathode electrodes 16 with an insulating layer 18 interposed therebetween, gate electrodes 20 being provided substantially perpendicular to cathode electrodes 16, electron emission sources 24 provided within holes 18a and 20a formed passing through insulating layer 18 and gate electrodes 20, respectively, and contacting cathode electrodes 16, an anode electrode 22 formed on a surface of faceplate 14 opposing backplate 12 and phosphor layers 26 formed on anode electrode 22.

Electron emission sources 24 are made of surface type carbon material, that is, carbon nanotubes. However, other configurations may be used for the present invention. Further, an example of an illuminating assembly most commonly used in FEDs was described, but the present invention is not limited to the structure presented above and other arrangements may be used.

Structural assembly 28 is provided between backplate 12 and front plate 14, that is, between gate electrodes 20 of backplate 12 and phosphor layers 26 of frontplate 14. Structural assembly 28 includes mesh grid 30 for focusing electron beams emitted from electron emission sources 24, and spacers 32 and 34 for supporting mesh grid 30.

Figure 2:
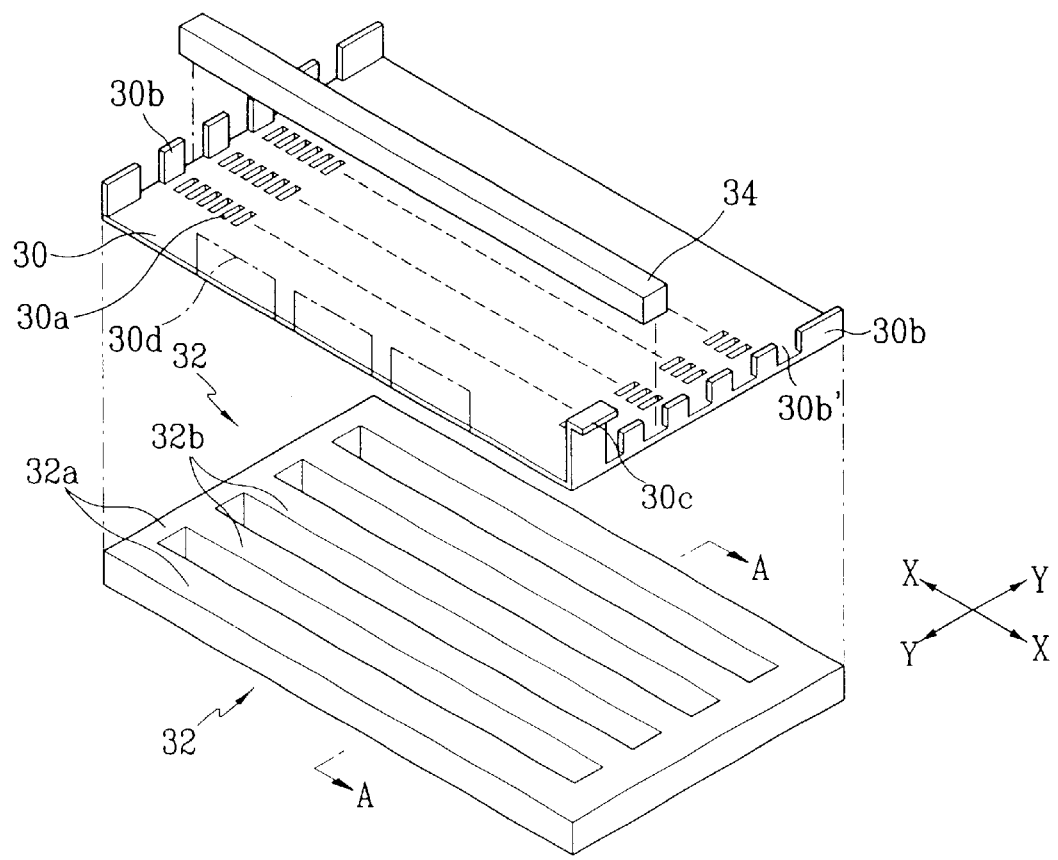
FIG. 2 is an exploded perspective view of a mesh grid, and upper and lower spacers of the flat panel display of FIG. 1.

Mesh grid 30, with reference to FIG. 2, is a substantially rectangular element having long sides and short sides, and includes a plurality of holes 30a formed therein. Spacers 32 and 34 include lower spacer 32 provided between backplate 12 and mesh grid 30 to maintain a uniform gap between these elements, and upper spacers 34 provided between mesh grid 30 and faceplate 14 to maintain a uniform gap between these elements.

The structures of spacers 32 and 34 as part of structural assembly 28 will now be described in more detail. Lower spacer 32 includes frame 32a having four sides to define an outer shape of lower spacer 32, and supports 32b provided at predetermined intervals within frame 32a and formed integrally to the same.

Figure 3A:
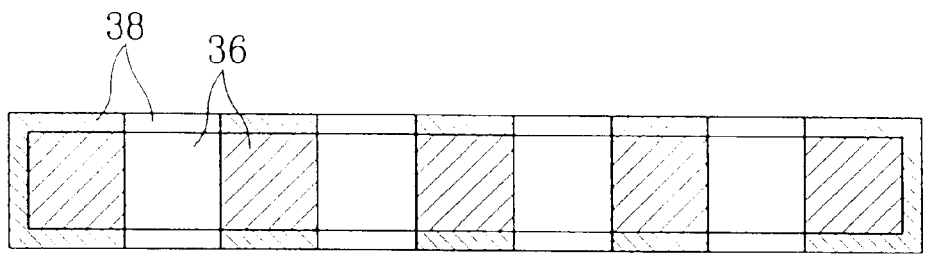
FIGS. 3a, 3b, and 3c are sectional views used to describe lower spacers according to an embodiment of the present invention.
Figure 3B:
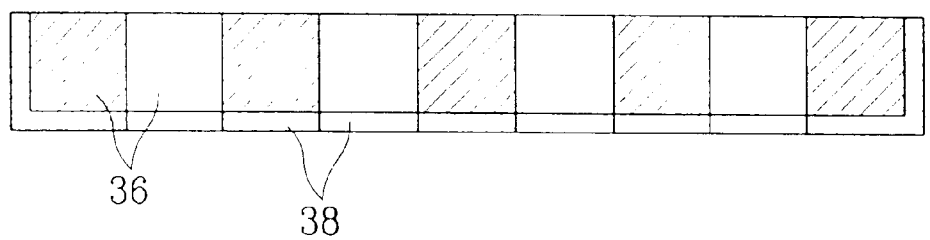
Figure 3C:
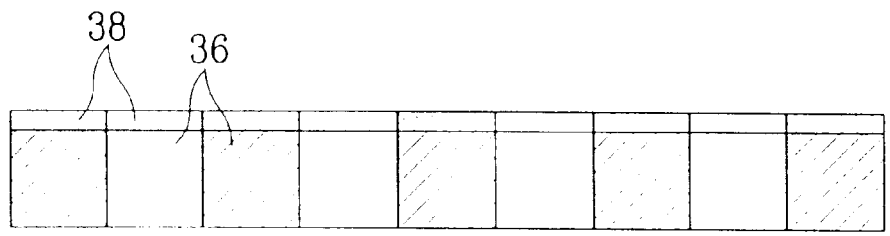

With reference to FIGS. 3a to 3c, lower spacer 32 is produced by etching metal frame 36 of a predetermined thickness to form frame 32a and supports 32b, after which an insulating layer 38 is formed on metal frame 36. That is, a surface of metal frame 36 is coated with an insulating material such as SiO2 by dipping or a CVD method. Alternatively, after a screen printing method is performed using an insulating material paste, drying and sintering are performed to form insulating layer 38. Insulating layer 38 may be formed over an entire surface of metal frame 36 as shown in FIG. 3a, or over specific areas of metal frame 36 as shown in FIGS. 3b and 3c. Insulating layer 38 prevents electrical conduction between metal frame 36 and gate electrodes 20 when lower spacer 32 is mounted in the FPD as described above.

Figure 4:
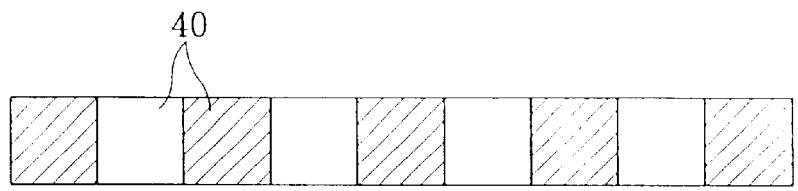
FIG. 4 is a sectional view used to describe lower spacers according to a modified example of the present invention.
Figure 5:
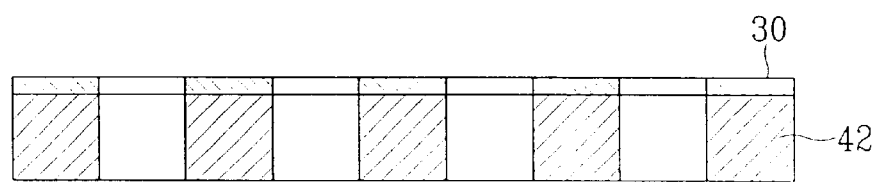
FIG. 5 is a sectional view used to describe lower spacers according to another modified example of the present invention.

With reference to FIG. 4, lower spacer 32 may be formed by etching frame 40 of glass or ceramic material of a predetermined thickness. As shown in FIG. 5, lower spacer 32 may also be formed by printing an insulating layer 42 on a lower surface of mesh grid 30.

Mesh grid 30 is then aligned on lower spacer 32 using alignment marks (not shown) to integrally connect these two elements. To perform this integral connection of lower spacer 32 and mesh grid 30, laser or resistance welding methods, or an adhesion method using frit or adhesive resin may be employed.

Upper spacers 34 are fixedly provided in mesh grid 30 by placing them within holding grooves 30b', which are formed by bending holding extensions 30b of mesh grid 30. That is, holding extensions 30b are formed at predetermined intervals along both short sides of mesh grid 30, and these holding extensions 30b are bent to be perpendicular to mesh grid 30 (i.e., bent in a direction toward faceplate 14 until substantially perpendicular to the same). As a result, holding grooves 30b' are formed between holding extensions 30b, and ends of upper spacers 34 are inserted into holding grooves 30b' to be secured therein.

Figure 6:
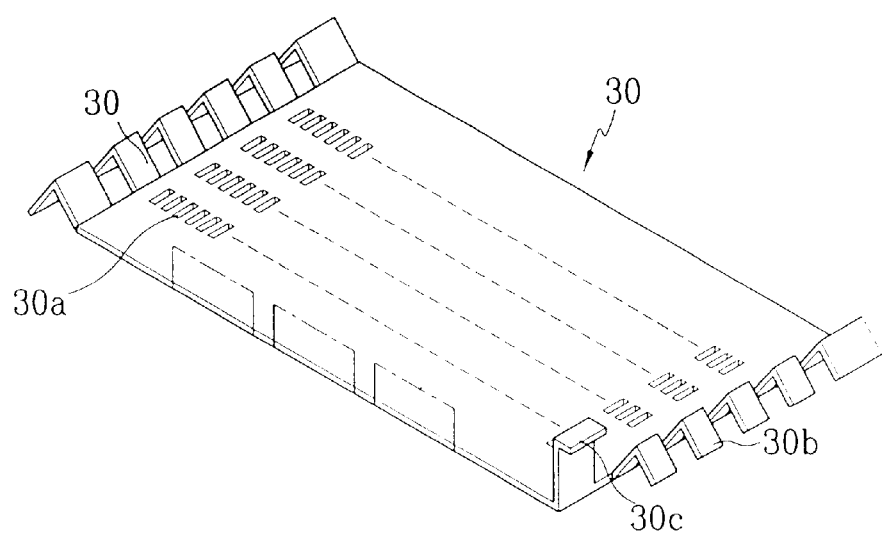
FIG. 6 is a perspective view of a modified example of the mesh grid of FIG. 1.

The bending configuration of holding extensions 30b may also be provided as shown in FIG. 6. In particular, holding extensions 30b of mesh grid 30 may be bent at a predetermined angle toward faceplate 14 such that an angle between an upper surface (in the drawing) of mesh grid 30 and holding extensions 30b is greater than ninety degrees.

In addition, terminal piece 30c is integrally formed to at least one of holding extensions 30b, and power is applied to mesh grid 30 through terminal piece 30c. Terminal piece 30c is shaped to allow for contact to a power application electrode formed on faceplate 14. This contact is made during manufacture of the FPD.

Further, a getter fixing terminal (not shown) for fixing a getter (not shown) to mesh grid 30 may be integrally formed to mesh grid 30. The getter forms and maintains a vacuum within the display. Getter dispersion prevention members 30d may be integrally formed to mesh grid 30 to prevent getter layers, which are dispersed during activation of the getter, from penetrating phosphor layers 26.

In the above, an example of integrally forming to mesh grid 30 holding extensions 30b, terminal piece 30c, and getter dispersion prevention members 30d was described. However, it is possible for holding extensions 30b, terminal piece 30c, and getter dispersion prevention members 30d to be separately manufactured then secured to mesh grid 30 by resistance welding or, preferably, by using laser welding so that deformation of mesh grid 30 does not occur.

In the embodiment of the present invention, upper spacers 34 inserted between holding extensions 30b are bar-shaped and may have substantially rectangular cross sections. Also, ends of upper spacers 34 are secured in holding grooves 30b' between holding extensions 30b by frit or an adhesive resin. It is to be noted that structural assembly 28 may be configured in various ways by changing the shape of upper and lower spacers 34 and 32, and the positioning of holding extensions 30b.

Figure 7A:
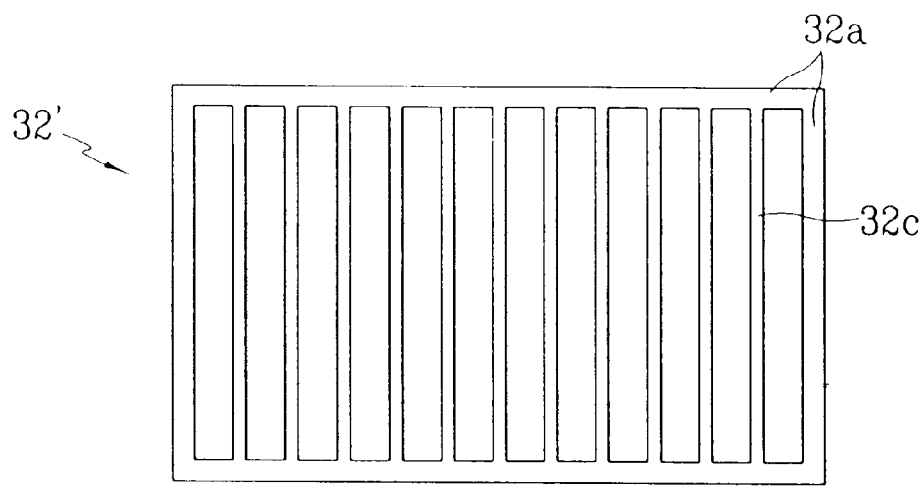
FIGS. 7a and 7b are plan views used to describe a lower spacer according to additional embodiments of the present invention.
Figure 7B:
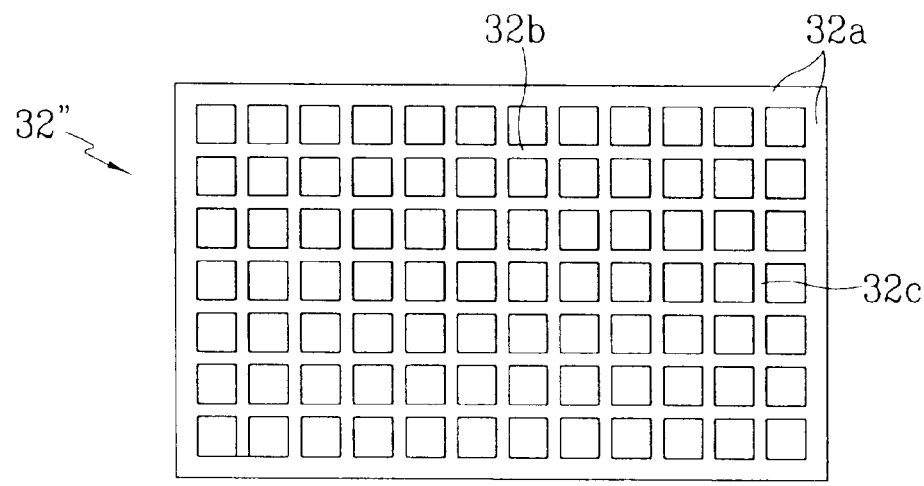

Structure assembly 28 according to another embodiment of the present invention will now be described. FIGS. 7a and 7b are plan views used to describe a lower spacer according to additional embodiments of the present invention.

A lower spacer 32' may be structured such that supports 32c are arranged within quadrilateral frame 32a along a short side direction of mesh grid 30 as shown in FIG. 7a. Also, with reference to FIG. 7b, lower spacer 32" may be structured including supports 32b and 32c that are provided within quadrilateral frame 32a substantially perpendicularly intersecting one another along long and short side directions, respectively, of mesh grid 30. In the case of the configuration of FIG. 7b, therefore, supports 32b and 32c realize a lattice structure.

Lower spacers 32, 32', and 32" structured as in the above may be combined in various ways with mesh grid 30 and upper spacers 34 as shown in FIGS. 8a, 8b, 8c, and 8d.

Figure 8A:
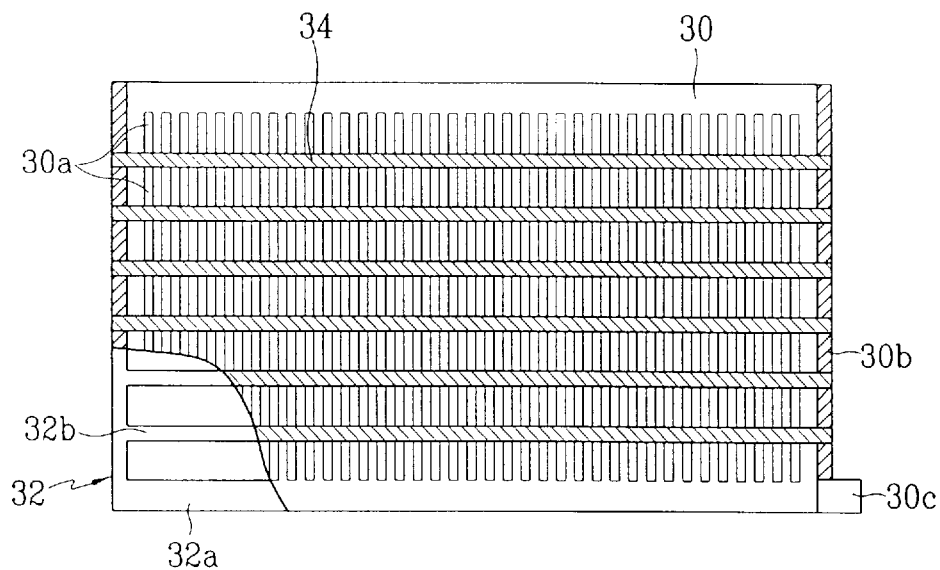
FIGS. 8a, 8b, 8c, and 8d are partially cutaway plan views used to describe a structure of a grid, and upper and lower spacers according to another embodiment of the present invention.
Figure 8B:
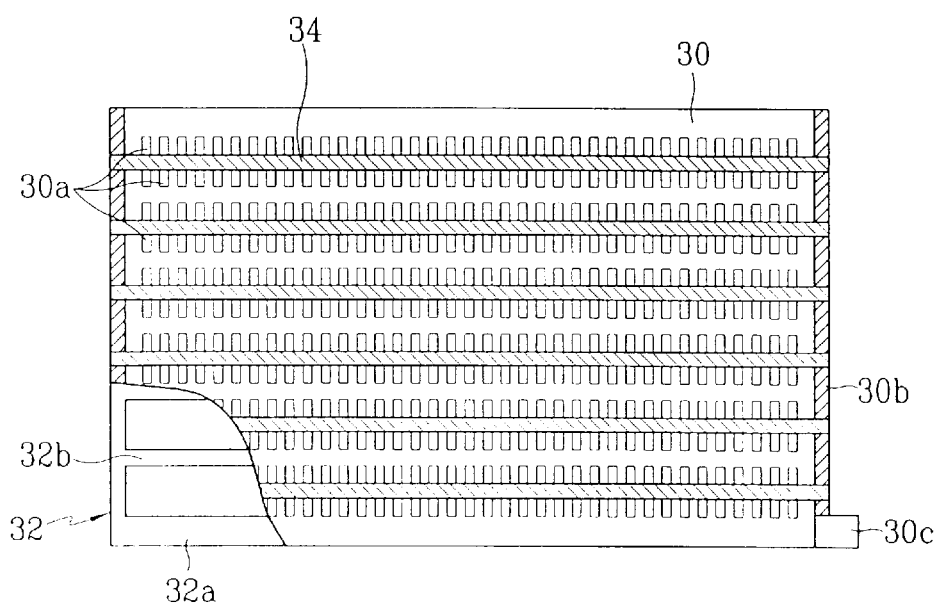

With reference to FIGS. 8a and 8b, upper spacers 34 are arranged in the same direction as supports 32b of lower spacer 32. FIG. 8a shows the case where upper spacers 34 are aligned with supports 32b, while FIG. 8b shows the case where upper spacers 34 are provided between supports 32b. In the configuration of FIG. 8b, assuming that upper spacers 34 are arranged along a center between each pair of supports 32b, upper spacers 34 divide holes 30a of mesh grid 30 into two equal parts.

Figure 8C:
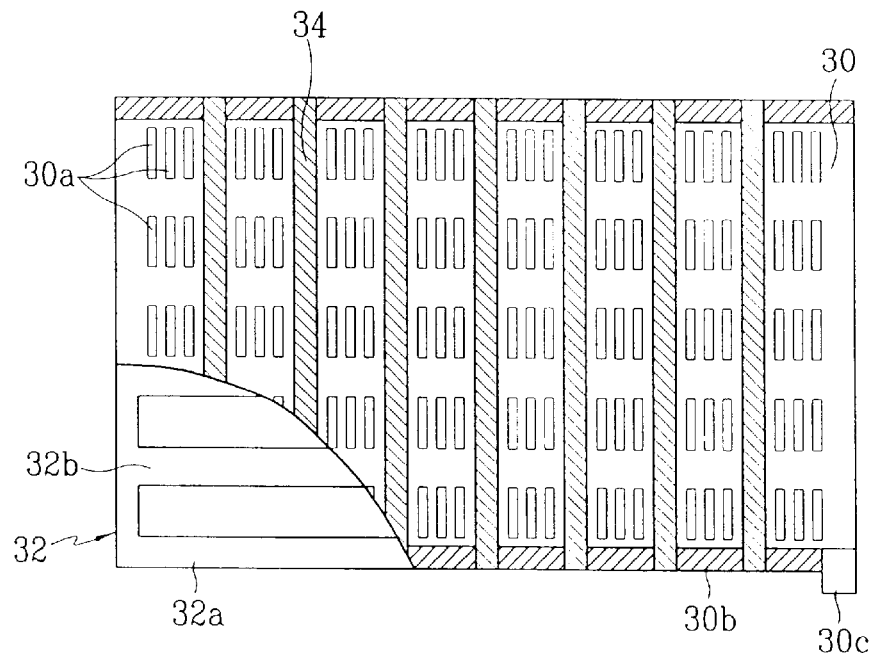
Figure 8D:
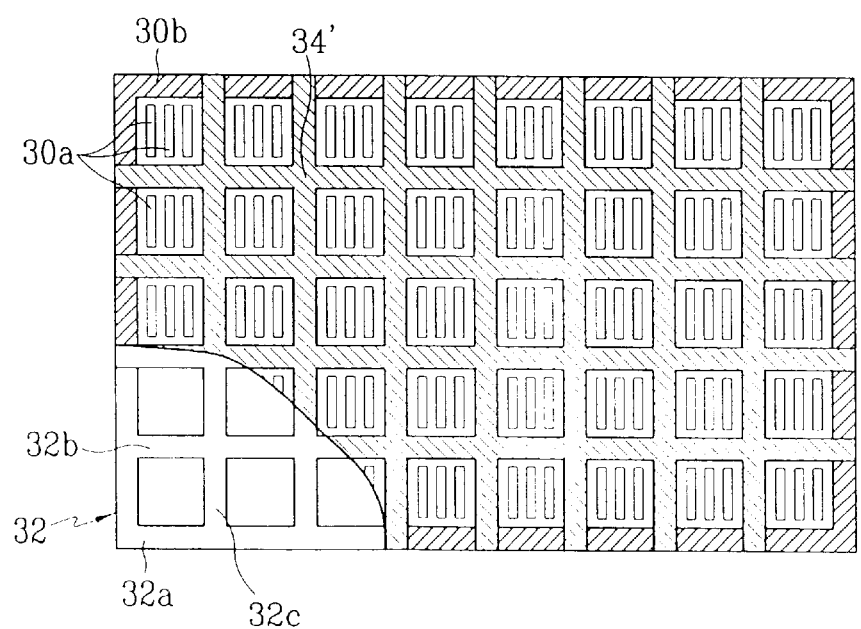

With reference to FIG. 8c, there is shown an example in which upper spacers 34 are arranged in a direction perpendicular to supports 32b of lower spacer 32. Further, as shown in FIG. 8d, upper spacers 34' may be provided in a lattice structure to be aligned with supports 32b and 32c of lower spacer 32" of FIG. 7b.

Structural assembly 28 as described above is assembled with backplate 12 and faceplate 14 using alignment marks to realize the FPD. For the operation of the FPD, electron beams emitted from and generated by electron emission sources 24 scan phosphor layers 26. During this process, a voltage is applied to mesh grid 30 through terminal piece 30c such that the electron beams are better focused.

Upper and lower spacers 34 and 32 fully support mesh grid 30 uniformly over an entire area thereof such that mesh grid 30 does not undergo deformation and is able to realize good operation. That is, with the support given by upper and lower spacers 34 and 32, mesh grid 30 is able to realize good operation without undergoing sagging at any location by its own weight. Also, thermal deformation caused by the high voltage applied to anode electrode 22 may be prevented.

In addition, with the structure of lower spacer 32 being integrally connected to mesh grid 30, and mesh grid 30 integrally including holding extensions 30b that define holding grooves 30b' into which the ends of upper spacers 34 are inserted, the assembly of structural assembly 28 itself and interconnection with backplate and faceplate 12 and 14 are easily performed. The integral formation of terminal piece 30c to one or more of holding extensions 30b also makes connection of mesh grid 30 to anode electrode 22 easy.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A flat panel display, comprising:
    a faceplate and a backplate provided opposing one another with a predetermined gap therebetween to define an exterior of the display;
    an illuminating assembly provided in the display, the illuminating assembly realizing predetermined images;
    a mesh grid provided between the backplate and the faceplate;
    a lower spacer connected to a surface of the mesh grid opposing the backplate to be supported by the backplate; and
    upper spacers connected to a surface of the mesh grid opposing the faceplate to be supported by the faceplate,
    wherein the mesh grid, the lower spacer, and the upper spacers are integrally formed into a single structural assembly.

2. The flat panel display of claim 1, wherein holding extensions are formed on opposing ends of the mesh grid, the holding extensions supporting the upper spacers.

3. The flat panel display of claim 2, wherein a plurality of the holding extensions are formed at predetermined intervals and are bent toward the faceplate such that holding grooves are formed between the holding extensions, ends of the upper spacers being inserted into the holding grooves to be secured therein.

4. The flat panel display of claim 3, wherein the holding extensions are bent to be perpendicular to the mesh grid.

5. The flat panel display of claim 3, wherein the holding extensions are bent to be other than at a right angle with the mesh grid.

6. The flat panel display of claim 3, wherein the mesh grid is substantially rectangular having long sides and short sides, and the upper spacers are provided along a direction of the long sides of the mesh grid for mounting to the mesh grid.

7. The flat panel display of claim 3, wherein the mesh grid is substantially rectangular having long sides and short sides, and the upper spacers are provided along a direction of the short sides of the mesh grid for mounting to the mesh grid.

8. The flat panel display of claim 6, wherein the upper spacers are bar-shaped.

9. The flat panel display of claim 7, wherein the upper spacers are bar-shaped.

10. The flat panel display of claim 3, wherein the mesh grid is substantially rectangular having long sides and short sides, and the upper spacers are provided along directions of the short sides and the long sides of the mesh grid for mounting to the mesh grid.

11. The flat panel display of claim 10, wherein the upper spacers are formed in a lattice configuration.

12. The flat panel display of claim 1, wherein the lower spacer comprises:
    a frame having four sides; and a plurality of supports provided at predetermined intervals within the frame and formed integrally to the same, the supports providing support to the mesh grid.

13. The flat panel display of claim 12, wherein the frame and the supports are made of a metal structure, and an insulating layer is provided to a predetermined thickness on a surface of the metal structure.

14. The flat panel display of claim 12, wherein the frame and the supports of the lower spacer are made of glass.

15. The flat panel display of claim 12, wherein the frame and the supports of the lower spacer are made of ceramic.

16. The flat panel display of claim 12, wherein the upper spacers are mounted on the mesh grid in the same direction as the supports of the lower spacer.

17. The flat panel display of claim 16, wherein the upper spacers are aligned with the supports of the lower spacer.

18. The flat panel display of claim 16, wherein the upper spacers are provided at locations corresponding to between the supports of the lower spacer.

19. The flat panel display of claim 12, wherein the upper spacers are mounted on the mesh grid in a direction perpendicular to the supports of the lower spacer.

20. The flat panel display of claim 2, wherein a terminal piece is integrally formed to one of the holding extensions, the terminal piece receiving an external power.

21. The flat panel display of claim 20, wherein the terminal piece is bent at a predetermined angle to the holding extension on which the terminal piece is formed.

22. The flat panel display of claim 1, wherein the mesh grid includes getter dispersion prevention members integrally formed to the mesh grid on one side of the same.

23. The flat panel display of claim 1, wherein the illuminating assembly comprises:

cathode electrodes formed on a surface of the backplate facing the faceplate;

gate electrodes provided over the cathode electrodes in a direction substantially perpendicular to the cathode electrodes;

an insulating layer interposed between the cathode electrodes and the gate electrodes;

electron emission sources provided within holes formed passing through the insulating layer and the gate electrodes, and contacting the cathode electrodes; an anode electrode formed on a surface of the faceplate opposing the backplate; and phosphor layers formed on the anode electrode.

* * * * *